US012641452B2

(12) United States Patent
Bell

(10) Patent No.: US 12,641,452 B2
(45) Date of Patent: May 26, 2026

(54) AUTOMATED METHOD AND SYSTEM FOR EVALUATING MOBILE APPLICATIONS TO FACILITATE NETWORK AND/OR APPLICATION REMEDIATION

(71) Applicant: Charter Communications Operating, LLC, St. Louis, MO (US)

(72) Inventor: Benjamin Sung Woong Bell, Denver, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 703 days.

(21) Appl. No.: 17/955,456

(22) Filed: Sep. 28, 2022

(65) Prior Publication Data

US 2024/0107341 A1 Mar. 28, 2024

(51) Int. Cl.
*H04W 24/06* (2009.01)
*H04W 24/02* (2009.01)

(52) U.S. Cl.
CPC ........... *H04W 24/06* (2013.01); *H04W 24/02* (2013.01)

(58) Field of Classification Search
CPC .............................. H04W 24/06; H04W 24/02
See application file for complete search history.

(56) References Cited

U.S. PATENT DOCUMENTS

| | | | | |
|---|---|---|---|---|
| 10,459,835 | B1 * | 10/2019 | George | ................. G06F 16/906 |
| 10,567,252 | B1 * | 2/2020 | Mukhopadhyaya | ......................... H04L 43/0805 |
| 11,277,733 | B2 | 3/2022 | Sevindik et al. | |
| 11,330,421 | B2 | 5/2022 | Sevindik et al. | |
| 11,797,472 | B2 | 10/2023 | Sevindik et al. | |
| 12,271,338 | B2 | 4/2025 | Sevindik et al. | |
| 2009/0219819 | A1 * | 9/2009 | Haverinen | ............ H04W 48/08 370/241 |
| 2010/0087175 | A1 * | 4/2010 | Roundtree | ........ H04M 3/42178 455/418 |
| 2014/0040667 | A1 * | 2/2014 | Zemer | ................. G06F 11/3684 714/E11.178 |
| 2020/0110694 | A1 * | 4/2020 | Elking | ................ G06F 11/3696 |
| 2020/0344658 | A1 * | 10/2020 | Huang | .................. H04W 24/02 |

(Continued)

OTHER PUBLICATIONS

Wikipedia, Samsung Galaxy S21, 12 pages downloaded Oct. 7, 2025 from https://en.wikipedia.org/wiki/Samsung_Galaxy_S21.

(Continued)

*Primary Examiner* — David Bilodeau
(74) *Attorney, Agent, or Firm* — Otterstedt & Kammer PLLC

(57) ABSTRACT

Execution of at least one script and at least one application on at least one wireless test device is facilitated. The at least one script includes device-executable code configured to simulate user interaction with the at least one application on the at least one wireless test device. The at least one script is executed to simulate the user interaction, while the at least one wireless test device is connected to a wireless network. Results of the execution of the at least one script and the at least one application are logged using a test platform. The results include application layer metrics and at least one of data link layer metrics and network layer metrics. The application layer metrics and the at least one of data link layer metrics and network layer metrics are correlated by timestamp.

24 Claims, 11 Drawing Sheets

(56) References Cited

U.S. PATENT DOCUMENTS

| | | | |
|---|---|---|---|
| 2020/0358810 A1* | 11/2020 | Fellows ................. | G06N 20/00 |
| 2021/0312107 A1* | 10/2021 | Koutsomanis ........ | G06F 9/5077 |
| 2022/0070691 A1* | 3/2022 | Ahmed .............. | G06F 11/3688 |

OTHER PUBLICATIONS

Wikipedia, OSI model, 9 pages downloaded Oct. 7, 2025 from https://en.wikipedia.org/wiki/OSI_model.
Wikipedia, Cellular network, 16 pages downloaded Oct. 7, 2025 from https://en.wikipedia.org/wiki/Cellular_network.
Farasat, Madiha, et al. "A review on 5G sub-6 GHz base station antenna design challenges." Electronics 10.16 (2021): 2000, 20 pages.
www.accuver.com, XCAL The World's : eading Drive Test Tool, 1 page downloaded from www.accuver.com Jul. 23, 2022.
Live Network Testing & Optimization | Ookla®, 14 pages downloaded Jul. 23, 2022 from https://www.ookla.com/wind, Ookla Wind® Wireless intelligence on demand.

* cited by examiner

Figure 6:
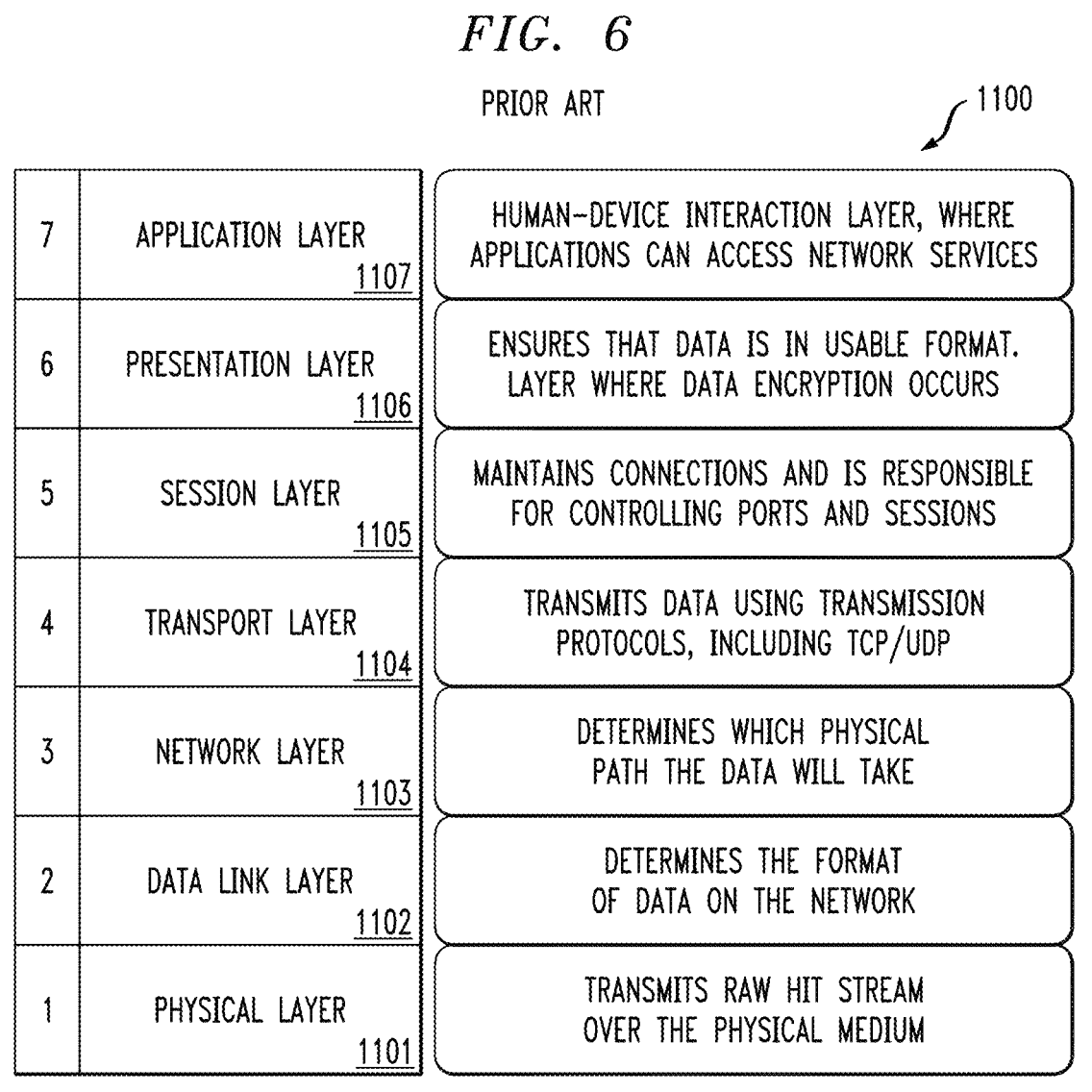

| 7 | APPLICATION LAYER 1107 | HUMAN-DEVICE INTERACTION LAYER, WHERE APPLICATIONS CAN ACCESS NETWORK SERVICES |
| 6 | PRESENTATION LAYER 1106 | ENSURES THAT DATA IS IN USABLE FORMAT. LAYER WHERE DATA ENCRYPTION OCCURS |
| 5 | SESSION LAYER 1105 | MAINTAINS CONNECTIONS AND IS RESPONSIBLE FOR CONTROLLING PORTS AND SESSIONS |
| 4 | TRANSPORT LAYER 1104 | TRANSMITS DATA USING TRANSMISSION PROTOCOLS, INCLUDING TCP/UDP |
| 3 | NETWORK LAYER 1103 | DETERMINES WHICH PHYSICAL PATH THE DATA WILL TAKE |
| 2 | DATA LINK LAYER 1102 | DETERMINES THE FORMAT OF DATA ON THE NETWORK |
| 1 | PHYSICAL LAYER 1101 | TRANSMITS RAW HIT STREAM OVER THE PHYSICAL MEDIUM |

*FIG. 10A*

| TIME_STAMP | GPS LON | GPS LAT | EVENT LOGGING STATUS | EVENT TECHNOLOGY | EVENT LTE EVENTS | EVENT 5G-NR EVENTS | EVENT AUTOCALL SCENARIO NAME | SOCIAL MEDIA CALL EVENT DETAIL CODE1 |
|---|---|---|---|---|---|---|---|---|
| 08:23.2 | -104.9983 | 39.75119 | SUCCESS | LTE | RRC SETUP START | | SOCIAL MEDIA SIMULATED USAGE | IDLE |
| 08:23.3 | -104.9983 | 39.75119 | SUCCESS | LTE | PRACH: Msg1(RA) | | | 3GPP NAS MESSAGE |
| 08:24.0 | -104.9983 | 39.75119 | SUCCESS | LTE | PRACH: Msg2(RAR) | | | LTE-L EVENT |
| 08:25.0 | -104.9983 | 39.75119 | SUCCESS | LTE | PRACH: Msg3(UE ID) | | | |
| 08:26.0 | -104.9983 | 39.75119 | SUCCESS | LTE | PRACH: Msg4[PASS] | | | |
| 08:27.0 | -104.9983 | 39.75119 | SUCCESS | LTE | RECEIVED RAR[TRUE] | | | |
| 08:28.0 | -104.9983 | 39.75119 | SUCCESS | LTE | | | | |
| 08:29.0 | -104.9983 | 39.75119 | SUCCESS | LTE | reportStrongestCells | | | |
| 08:29.4 | -104.9983 | 39.75119 | SUCCESS | LTE | eventB2_NR_r15 | | | LTE-L EVENT |
| 08:29.4 | -104.9983 | 39.75119 | SUCCESS | LTE | | | | LTE-L EVENT |
| 08:29.4 | -104.9983 | 39.75119 | SUCCESS | LTE | | | | 3GPP NAS MESSAGE |
| 08:29.4 | -104.9983 | 39.75119 | SUCCESS | LTE | | | | LTE-L EVENT |
| 08:29.4 | -104.9983 | 39.75119 | SUCCESS | LTE | | | | LTE-L EVENT |
| 08:29.4 | -104.9983 | 39.75119 | SUCCESS | LTE | | | | LTE-L EVENT |
| 08:29.4 | -104.9983 | 39.75119 | SUCCESS | LTE | | | | |
| 08:29.4 | -104.9983 | 39.75119 | SUCCESS | LTE | | | | |
| 08:29.4 | -104.9983 | 39.75119 | SUCCESS | LTE | | | | |
| 08:29.5 | -104.9983 | 39.75119 | SUCCESS | LTE | | | | |
| 08:29.5 | -104.9983 | 39.75119 | SUCCESS | LTE | | | | |
| 08:29.5 | -104.9983 | 39.75119 | SUCCESS | LTE | | | | |

*FIG. 10B*

| TIME_STAMP | VIDEO CALL EVENT DETAIL CODE1 | APP THROUGHPUT INFO(ALL DATA) ALL FWD THROUGHPUT(kbps) | APP THROUGHPUT INFO(ALL DATA) ALL RVS THROUGHPUT(kbps) | LTE KPI PDSCH THROUGHPUT [Mbps] | 5g KPI TOTAL INFO LAYER1 PDSCH THROUGHPUT [Mbps] | QoS QCI |
|---|---|---|---|---|---|---|
| 08:23.2 | START | 30000 | 21000 | 0.200 | 0.000 | QCI 9 |
| 08:23.3 | SERVICE REQUEST | 45000 | 28000 | 0.600 | 0.000 | QCI 9 |
| 08:24.0 | RRCStart | 40139 | 25015 | 0.537 | 0.000 | QCI 9 |
| 08:25.0 | | 40336 | 27831 | 0.553 | 0.000 | QCI 9 |
| 08:26.0 | | 40286 | 27686 | 0.545 | 0.000 | QCI 9 |
| 08:27.0 | | 40303 | 27807 | 0.545 | 0.000 | QCI 9 |
| 08:28.0 | | 40289 | 27733 | 0.545 | 0.000 | QCI 9 |
| 08:29.0 | | 40295 | 27759 | 0.545 | 0.000 | QCI 9 |
| 08:29.4 | RRCConnectionSetup | 40294 | 27742 | 0.545 | 0.000 | QCI 9 |
| 08:29.4 | RRCComplete | 40295 | 27746 | 0.545 | 0.000 | QCI 9 |
| 08:29.4 | SecurityModeCommand | 40294 | 27743 | 0.545 | 0.000 | QCI 9 |
| 08:29.4 | SecurityModeComplete | 40294 | 27746 | 0.545 | 0.000 | QCI 9 |
| 08:29.4 | RRCConnection RECONFIGURATION | 40294 | 27746 | 0.545 | 0.000 | QCI 9 |
| 08:29.4 | RRCConnection RECONFIGURATION COMPLETE | 40294 | 27746 | 0.545 | 0.000 | QCI 9 |
| 08:29.4 | | 40294 | 27746 | 0.545 | 0.000 | QCI 9 |
| 08:29.4 | | 40294 | 27746 | 0.545 | 0.000 | QCI 9 |
| 08:29.4 | | 40294 | 27746 | 0.545 | 0.000 | QCI 9 |
| 08:29.5 | | 40294 | 27746 | 0.545 | 0.000 | QCI 9 |
| 08:29.5 | | 40294 | 27746 | 0.545 | 0.000 | QCI 9 |
| 08:29.5 | | 40294 | 27746 | 0.545 | 0.000 | QCI 9 |

AUTOMATED METHOD AND SYSTEM FOR EVALUATING MOBILE APPLICATIONS TO FACILITATE NETWORK AND/OR APPLICATION REMEDIATION

FIELD OF THE INVENTION

The present invention relates generally to the electrical, electronic and computer arts, and, more particularly, to testing, remediating, and operating wireless mobile telephony networks and the like.

BACKGROUND OF THE INVENTION

Cellular network performance is currently analyzed through the use of a combination of radio frequency (RF) testing tools and user experience assessments performed on popular mobile device models. RF and user experience metrics are typically logged automatically by software platforms through the duration of the test period. Test periods include user experience assessments and are performed using a series of commonly used mobile applications ("apps") such as social media, web browsers, and other pertinent applications.

Current network performance evaluations using standard data collection methods typically collect measurements and events from the network layer (L3) and the data link layer (L2) (the layer designations refer to the well-known International Standards Organization (ISO) Open Systems Interconnection (OSI) seven-layer model). FIG. 6, discussed in detail below, illustrates the OSI model and the seven layers across the stack, while FIGS. 7A, 7B, and 8, discussed in detail below, illustrate the sublayers L2 downlink, L2 uplink, and L3, respectively. At present, network performance evaluations do not correlate the events or the user experience from the application layer (L7) to the L2/L3 data, and all L7 applications must be manually controlled by human users (e.g., by tapping a touch screen) to execute commands on the test devices.

State-of-the-art testing generally includes teams of people in the testing areas manually performing a list of actions on each application, while simultaneously monitoring key performance indicators (KPIs). The step-by-step list of actions proceeds consecutively, and each step must be manually initiated. Currently, discrepancies in the time between actions, which are inherent to the manual process, create inconsistent tests; thus, there is no standard for evaluating the user experience across all applications.

SUMMARY OF THE INVENTION

Principles of the invention provide techniques for automatically evaluating mobile applications to facilitate network and/or application remediation. In one aspect, an exemplary method includes facilitating execution of at least one script and at least one application on at least one wireless test device, the at least one script including device-executable code configured to simulate user interaction with the at least one application on the at least one wireless test device, the at least one script being executed to simulate the user interaction, while the at least one wireless test device is connected to a wireless network; and logging results of the execution of the at least one script and the at least one application using a test platform, the results including application layer metrics and at least one of data link layer metrics and network layer metrics, wherein the application layer metrics and the at least one of data link layer metrics and network layer metrics are correlated by timestamp.

In another aspect, an exemplary system includes a memory; and at least one processor, coupled to the memory, and operative to carry out and/or otherwise facilitate the method steps described just above.

In still another aspect, an exemplary system for testing application performance in wireless networks includes at least one wireless test device configured to execute at least one script and at least one application while the at least one wireless test device is connected to the wireless network. The at least one script includes device-executable code configured to simulate user interaction with the at least one application on the at least one wireless test device. The at least one script is executed to simulate the user interaction. The system also includes a test platform configured to log results of the execution of the at least one script and the at least one application. The results include application layer metrics and at least one of data link layer metrics and network layer metrics. The application layer metrics and the at least one of data link layer metrics and network layer metrics are correlated by timestamp.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine-readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., wireless test device, test platform, and the like) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:

Improves technological process(es) of operating, maintaining, and remediating/upgrading a wireless telephony network via automation of simulated user operation on mobile cellular devices, eliminating the need for user input by device testers and physical access to the device for testing.

Allows for a single user to run simultaneous testing on multiple devices where it would be normally impossible.

The autonomous nature of the testing ensures that the application tests are conducted consistently across devices and users.

The automation allows for testing either through tethered connections or wirelessly across multiple devices and locations.

Conventional application testing restricts the test parameters to localized testing, while an automated approach according to one or more embodiments allows testing anywhere where a network connection (e.g., an internet connection; a cellular network to which a smart phone or the like can be connected) can be established.

Improves network troubleshooting through rapid deployment of remote application testing, where technicians or engineers might be otherwise deployed to investigate user complaints.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 6 shows the Open Systems Interconnection (OSI) seven-layer model, well-known from the prior art;

FIGS. 10A and 10B show exemplary correlation between commands at the different levels, in accordance with an aspect of the invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Figure 1:
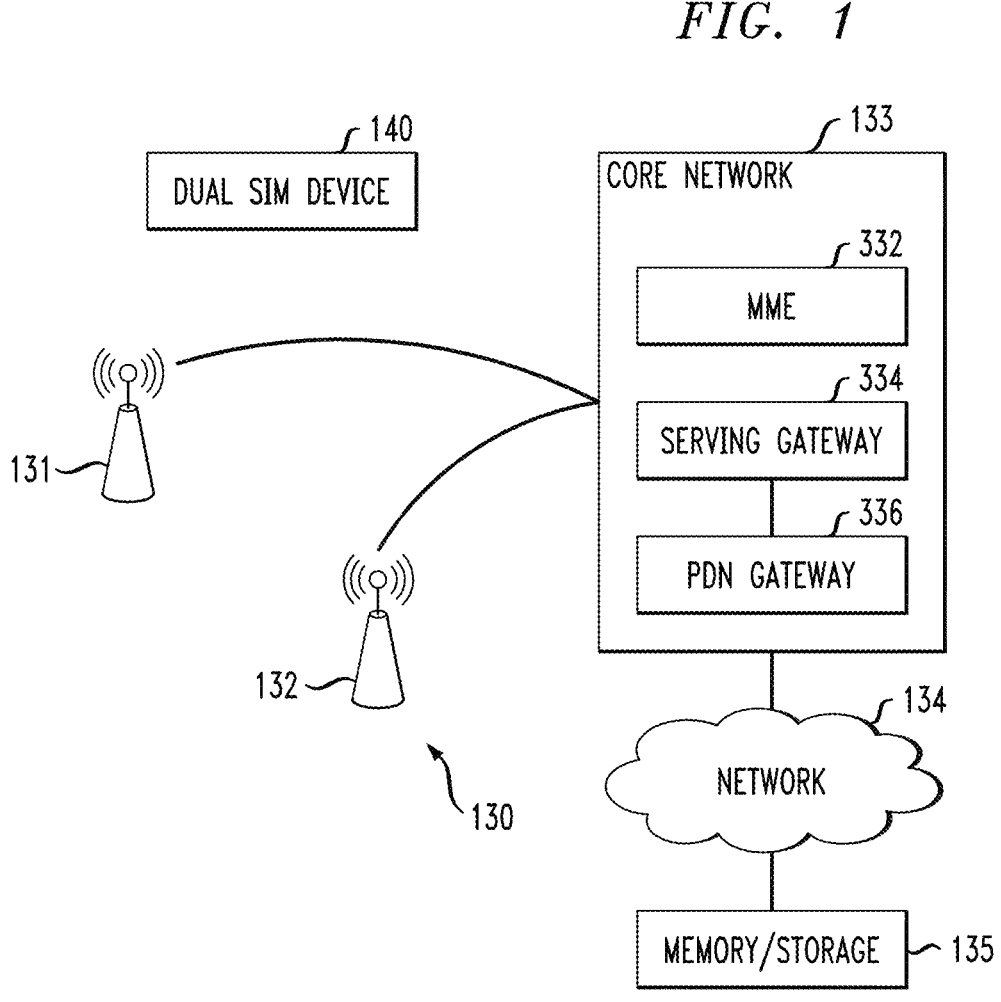
FIG. 1 is a block diagram of cellular telephony system, within which one or more aspects of the invention can be implemented.

FIG. 1 is a diagram of an example cellular telephony network 130 including dual subscriber identification module (SIM) devices such as device 140. The network 130 provides wireless coverage, and includes base stations 131 and 132. The number of base stations is illustrative, and the network may include more or fewer base stations. The base stations 131 and 132 are in communication with a core network 133, which includes a mobility management entity (MME) 332, a serving gateway 334, and a packet data network (PDN) gateway 336. The core network 133 is in communication with a network 134, which includes, for example, the Internet, and which is in communication with a memory/storage 135. Devices with only a single SIM or other numbers of SIMS can also be used in network 130.

The dual SIM device 140 (or device with other number of SIMS) is in communication with one of the base stations 131 and 132. An exemplary dual SIM device is discussed below with regard to FIG. 2. FIG. 1 is illustrative, and embodiments may include additional, fewer or different devices, entities, and the like which may be similarly or differently architected without departing from the scope of the specification and claims herein. Moreover, the illustrated devices may perform other functions without departing from the scope of the specification and claims herein. Furthermore, there may be multiple such networks with different operators such that a device 140 may have a "home" network and may "roam" to other networks.

The base stations 131 and 132 can include, for example, a node-B, an evolved node-B, an access point, an access node or like device which enables radio communications access among/between, for example, the dual SIM device 140 and/or other devices. Each base station 131 and 132 can, for example, have sectors which provide wireless communications coverage.

The dual SIM device 140 includes, by way of example but not limitation, end user devices, cellular telephones, Internet Protocol (IP) devices, mobile computers, laptops, handheld computers, PDAs, personal media devices, smartphones, notebooks, notepads, phablets and the like which include two SIMS and at least one radio. Furthermore, as noted, the network 130 can be used by such mobile devices with only a single SIM or more than 2 SIMS.

Figure 2:
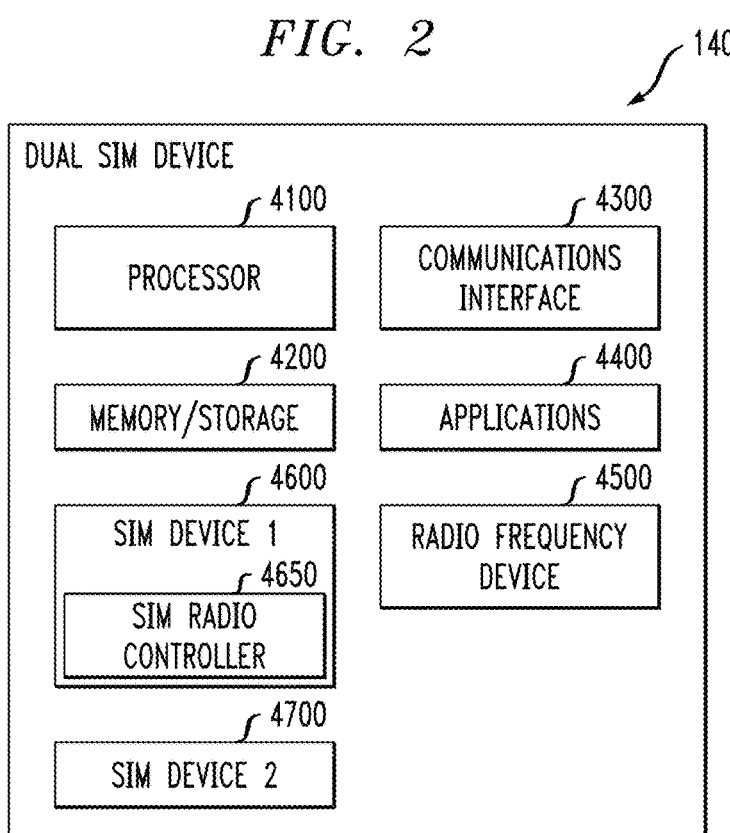
FIG. 2 is a functional block diagram illustrating an exemplary dual-SIM telephony device, useful within the system of FIG. 1.

FIG. 2 is a block diagram of an example of a dual-SIM device 140. The device 140 may include, but is not limited to, a processor 4100, a memory/storage 4200, a communication interface 4300, applications 4400, a radio frequency device 4500, a first SIM 4600, a SIM level task scheduler or SIM radio controller 4650, and a second SIM 4700. In an implementation, the SIM level task scheduler or SIM radio controller 4650 may be implemented as a combination of software and firmware as part of the first SIM 4600. The device 140 may include other elements which may be desirable or necessary to implement the devices, systems, compositions and methods described herein.

Figure 3:
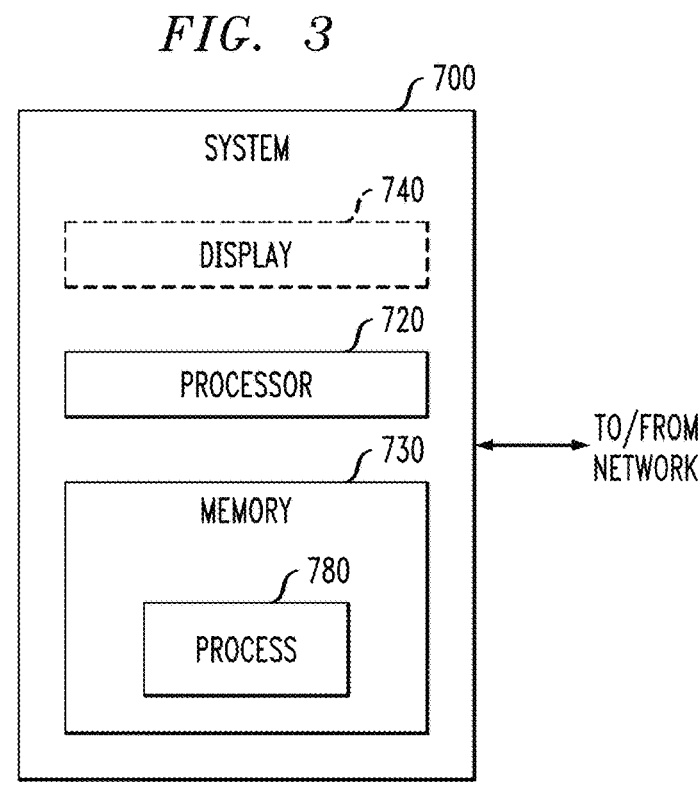
FIG. 3 is a block diagram of a computer system useful in connection with one or more aspects of the invention.

FIG. 3 is discussed below.

Figure 4:
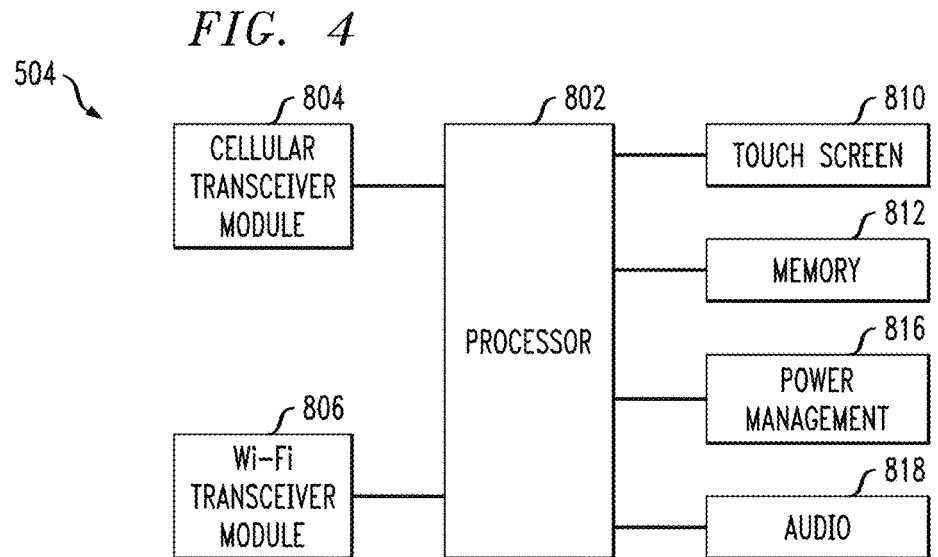
FIG. 4 is a functional block diagram illustrating an exemplary cellular telephony device, useful within the system of FIG. 1.

FIG. 4 is a block diagram of an exemplary cellular telephony device 504. Device 504 includes a suitable processor; e.g., a microprocessor 802. A cellular transceiver module 804 coupled to processor 802 includes an antenna and appropriate circuitry to send and receive cellular telephone signals, e.g., 3G, 4G, 5G, and future generations. An optional Wi-Fi transceiver module 806 coupled to processor 802 includes an antenna and appropriate circuitry to allow device 504 to connect to the Internet via a wireless network access point or hotspot. The skilled artisan will appreciate that "Wi-Fi" is a trademark of the Wi-Fi Alliance and the brand name for products using the IEEE 802.11 family of standards.

Touch screen 810 coupled to processor 802 is also generally indicative of a variety of devices such as a keypad, another type of display, a mouse or other pointing device, and so on, all of which may or may not be present in one or more embodiments. Memory 812 coupled to processor 102 and memory 4200 in FIG. 2 can be similar to the memory 730 discussed below in connection with FIG. 3, for example. Audio module 818 coupled to processor 802 includes, for example, an audio coder/decoder (codec), speaker, headphone jack, microphone, and so on. Power management system 816 can include a battery charger, an interface to a battery, and so on.

Principles of the present disclosure will be described herein in the context of apparatus, systems, and methods for automatically evaluating mobile applications; responsive to such evaluation, mobile application(s) and/or mobile network(s) can be remediated (e.g., repaired, modified, adjusted, and/or upgraded). It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

As noted, state-of-the-art testing of mobile applications, to evaluate the performance of a wireless cellular telephony network, generally includes teams of people in the testing areas manually performing a list of actions on each application, while simultaneously monitoring key performance indicators (KPIs). The step-by-step list of actions proceeds consecutively, and each step must be manually initiated. Currently, discrepancies in the time between actions, which are inherent to the manual process, create inconsistent tests; thus, there is no standard for evaluating the user experience across all applications.

Advantageously, one or more embodiments provide automation of simulated user operation on mobile cellular devices, eliminating the need for both user input by device testers and physical access to the device(s) for testing. One or more embodiments enable a single user to run simultaneous tests on multiple devices. Furthermore, in one or more embodiments, the autonomous nature of the testing ensures that the application tests can be conducted consistently across devices and users. In one or more embodiments, automation allows for testing through tethered connections and/or wirelessly across multiple devices and locations. Unlike conventional application testing, which restricts the test parameters to localized testing, an automated approach according to one or more embodiments allows testing anywhere that a suitable network connection, such as an internet connection, can be established. Application automation in accordance with one or more embodiments can be applied to any type of mobile operating system, such as the Android® (registered mark of GOOGLE LLC MOUNTAIN VIEW CALIFORNIA USA) or iOS® (registered mark of Cisco Technology, Inc. San Jose CALIFORNIA) operating systems. and can be deployed on any suitable network, such as any cellular network to which a smart phone can be connected.

One or more embodiments implement specialized software that automates some or all L7 commands, advantageously removing the requirement for direct human interaction. In addition, in one or more embodiments, the software synchronizes L7/L3/L2 data, which allows for direct correlation analysis. In at least some cases, the software is directly scalable, allowing for simultaneous concurrent test cases to be executed in an automated fashion on any number of devices.

FIG. 6 shows the well-known Open Systems Interconnection (OSI) seven-layer model 1100. The physical layer 1101, OSI Layer 1, is concerned with transmitting raw bits over a communications channel. The data link layer 1102, OSI Layer 2, determines the format of the data' for example, breaking into data frames and processing acknowledgement frames. The network layer 1103, OSI Layer 3, determines the physical path the data will take; e.g., routing of packets. The transport layer 1104, OSI Layer 4, transmits data using a suitable protocol, such as transmission control protocol (TCP) or user datagram protocol (UDP). The session layer 1105, OSI Layer 5, maintains connection and controls ports and sessions (such as remote log-in, file sharing, and the like). The presentation layer 1106, OSI Layer 6, ensures that data is in a usable format (for example, encoding data in a standard way) and also handles data encryption. The application layer 1107, OSI Layer 7, handles human-device interaction and allows applications to access network services.

Figure 7A:
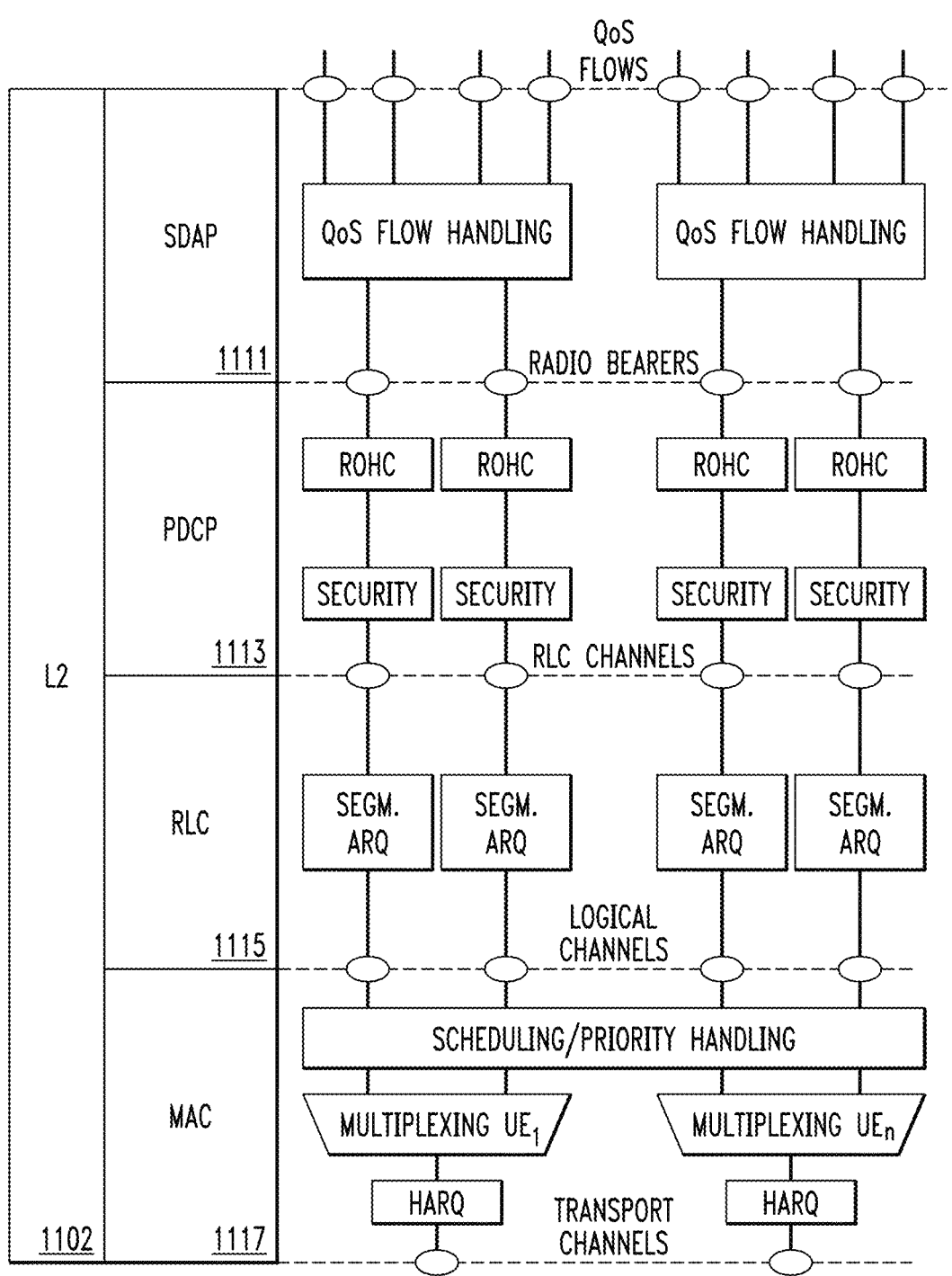
FIG. 7A shows the sublayer L2 downlink of the OSI seven-layer model, as known from the prior art.
Figure 7B:
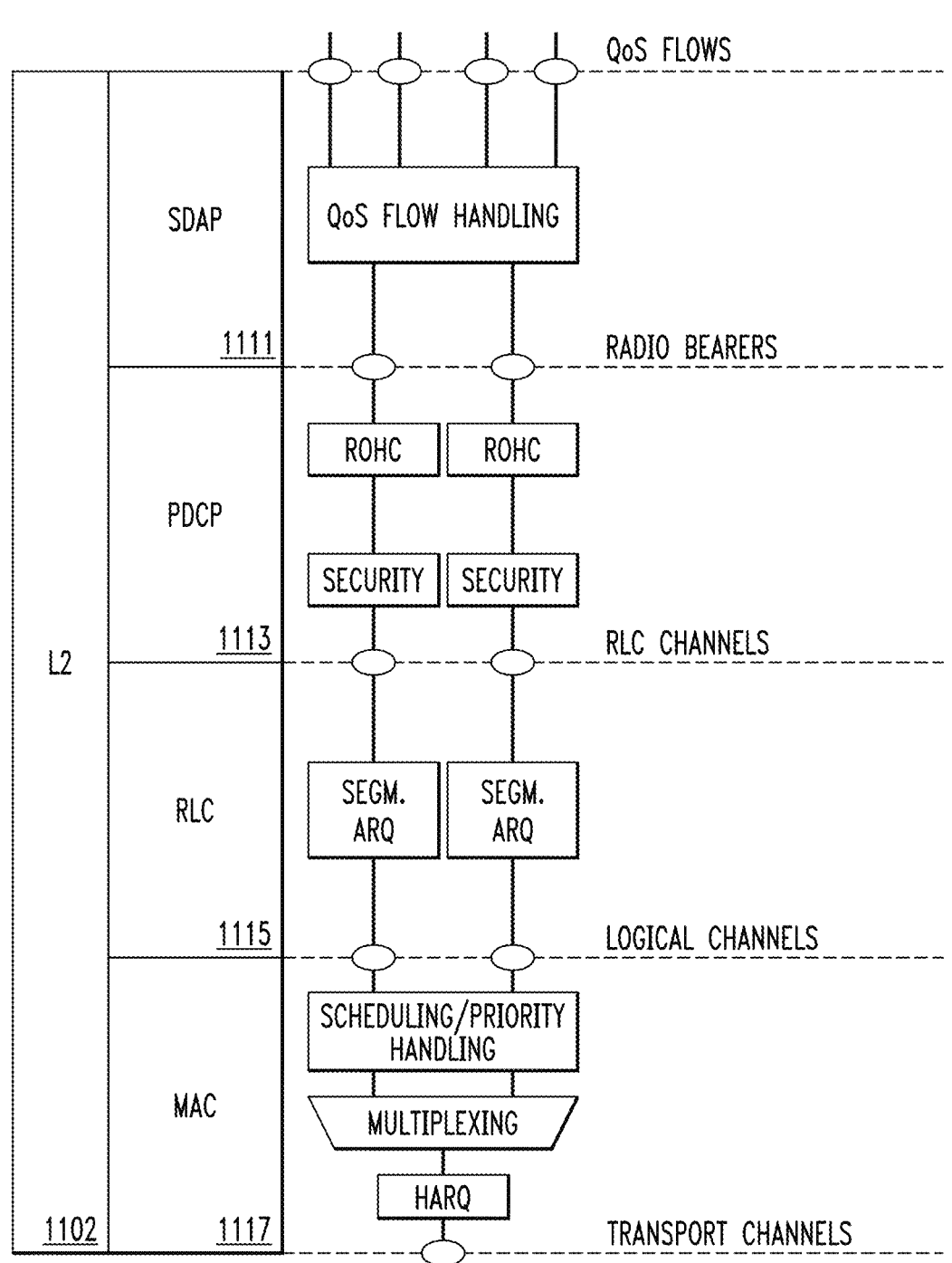
FIG. 7B shows the sublayer L2 uplink of the well-known OSI seven-layer model, as known from the prior art.

FIG. 7A (downlink) and 7B (uplink) show sublayers of Layer 2 of the well-known OSI seven-layer model shown in FIG. 6. SDAP (Service Data Adaptation Protocol) sublayer 1111 carries our quality of service (QoS) flow handling. PDCP (Packet Data Convergence Protocol) sublayer 1113 implements security and Robust Header Compression (ROHC). Radio link control (RLC) sublayer 1115 carries out error control using ARQ (Automatic Repeat Query). The Media Access Control, or MAC, sublayer 1117 of Layer 2 manages how the network receives and disseminates data, including scheduling/priority handling, multiplexing, and hybrid automatic repeat request (hybrid ARQ or HARQ).

Figure 8:
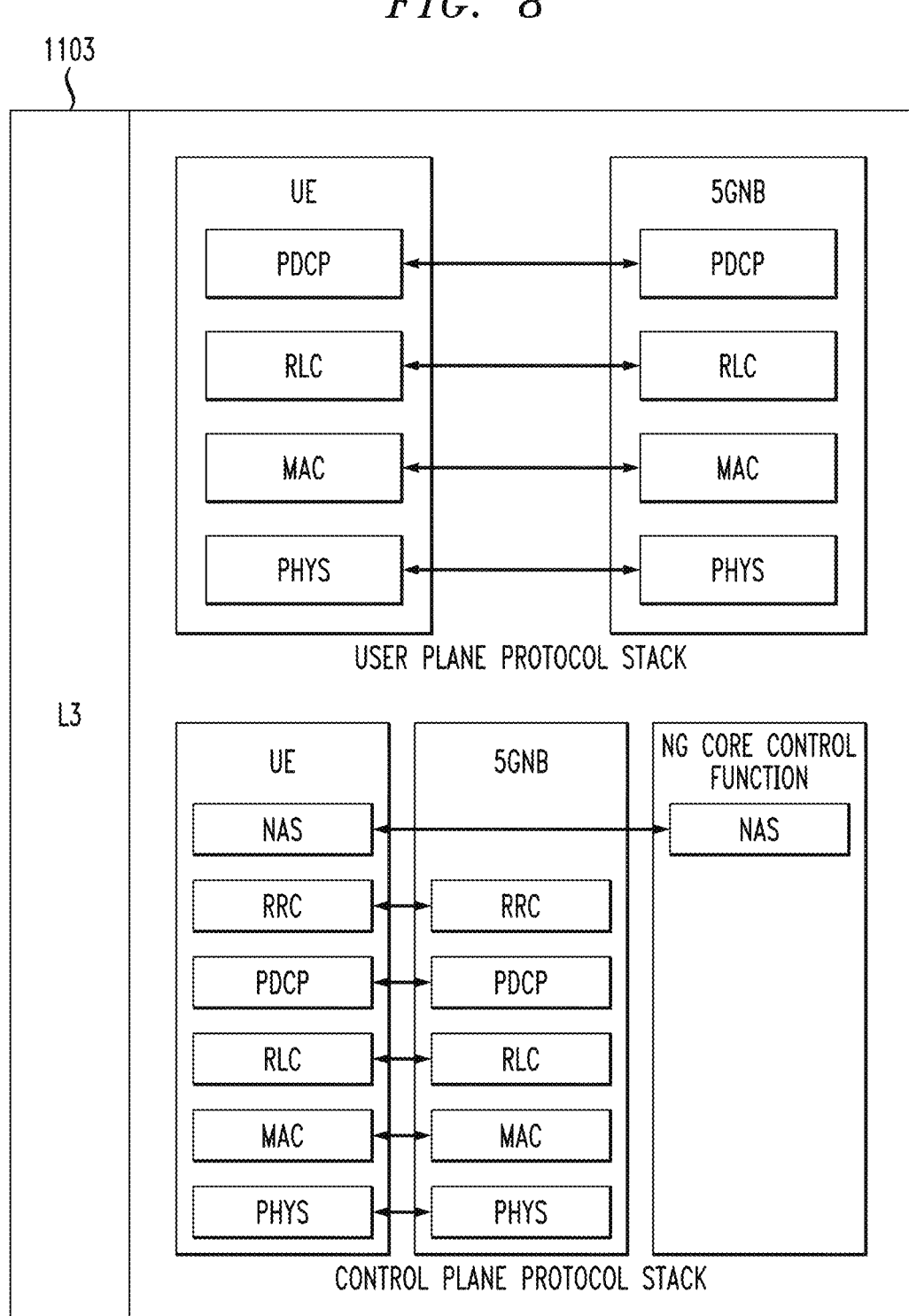
FIG. 8 shows the sublayer L3 of the well-known Open Systems Interconnection (OSI) seven-layer model, as known from the prior art.

FIG. 8 shows sublayers of Layer 3 of the well-known OSI seven-layer model shown in FIG. 6. Note user equipment (UE) and Fifth Generation NodeB (5GNB) (base station) in the user plane protocol stack, with interaction at the physical (PHYS), MAC, RLC, and PDCP sublayers. In the control plane protocol stack, note additionally the NG (next generation) core control function, with interaction at the physical (PHYS), MAC, RLC, PDCP, Radio resource control (RRC) and Non-access stratum (NAS) sublayers.

In one or more embodiments, all of the different pertinent messages are picked up by the data collection platform (e.g., test platform 1424 discussed elsewhere herein). Because recording is also being carried out, it is known what the phone did/accessed/posted at a certain time, the time can be linked to the event. For example, Layer 2 KPIs can be linked with a specific event. The same is true for the Layer 3 material. On Layer 3, RRC (radio resource control) enables communications between the cell phone and tower with respect to the radio conditions. It is possible to see messages such as the phone requesting to access Tower A, switching to Tower B, and the like—including NAS, RRC and RLC messages. All these types of messages can be seen coming in and can be associated with what goes on in Layer 7 (i.e., the inputs to the device). This is facilitated by the automation in accordance with one or more embodiments. Advantageously, in one or more embodiments, all the messages and KPIs (metrics and data) coming in can be seen and then that data can be linked to Layer 7, thus correlating the user-device interactions with the Layer 2 and 3 events, in contrast to prior art techniques.

Currently, some data collection is automatically performed by, for example, the Accuver XCAL testing platform available from Accuver Americas, Plano, TX, USA. Many applications are still tested manually. Conventionally, even when processes are partially automated, after collecting all the data, a user needs to correlate and back-trace where Layer 7 commands or inputs fall in line with Layer 2 and Layer 3 data. One or more embodiments advantageously automate some or all aspects of the testing process, to obtain repeatable testing situations, which have heretofore not been achieved. Aspects of the invention make use of the insight that the Layer 7, Layer 2, and Layer 3 logs correlate with each other (volume-wise). That is to say, in one or more embodiments, all of Layers 2, 3, and 7 are captured rather than just Layers 1, 2, and 3 (optionally, Layer 1 can also be captured in one or more embodiments—in one or more non-limiting exemplary embodiments, Layers 2, 3, and 7 are of significance in order to take cognizance of the messaging in Layers 2 and 3 and coordinate same with the application Layer 7, but Layer 1 can be captured if desired). In terms of data coming in line-by-line/row-by-row, the data will all line up by time (see discussion of FIG. 10 below). For data in Layer 7, corresponding Layer 2 and Layer 3 information will be seen. Such correlation has not been available heretofore; it has typically been necessary to manually sort through the data, even in cases of partial automation. One or more embodiments advantageously overcome problems with the prior art in terms of determining correlation between the Layers 2, 3, and 7, and achieving repeatability. In the past, despite the skill of the tester, there have still been variations between tests.

Figure 5A:
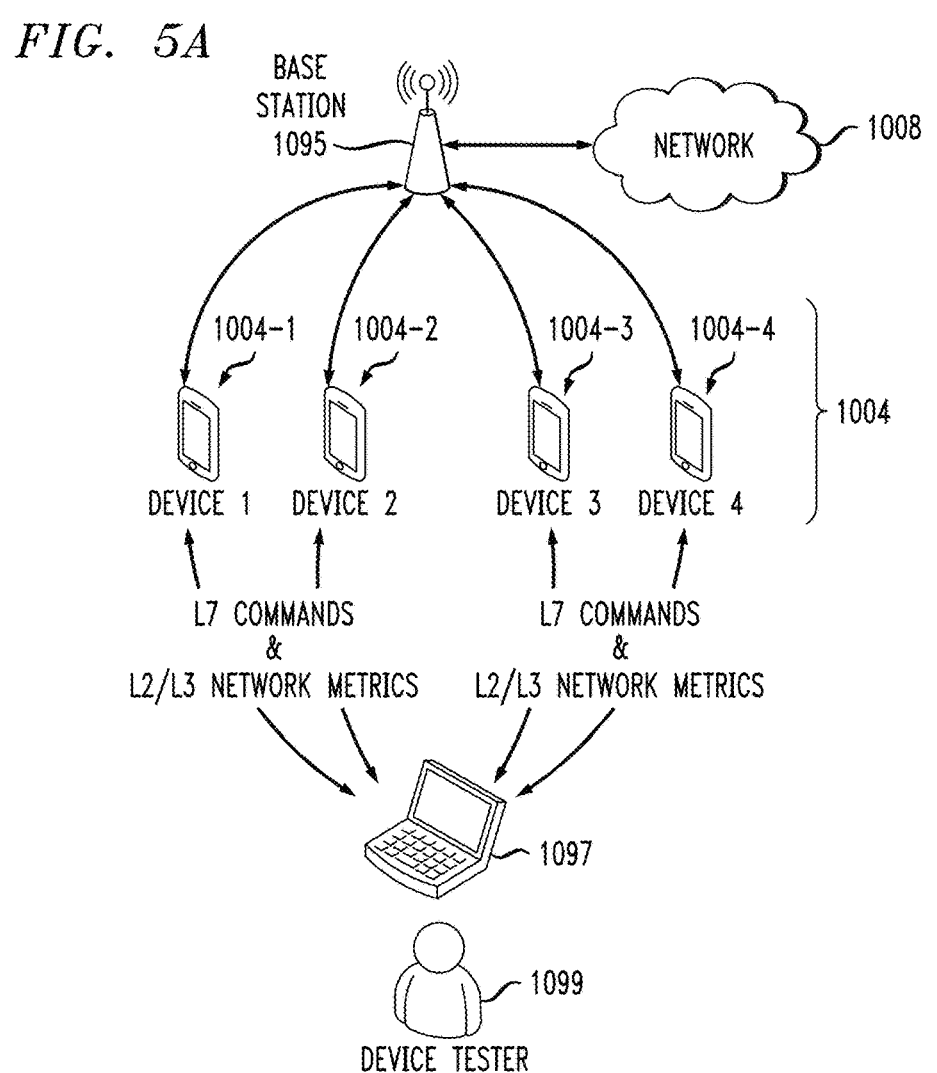
FIG. 5A is system diagram, in accordance with an aspect of the invention.

FIG. 5A is a high-level diagram of an exemplary test platform, in accordance with an exemplary embodiment. The number of devices 1004 under test is limited only by the number of devices 1004 that can be supported by the test platform. For example, a conventional test platform may support sixty-four devices (for illustrative convenience, four devices 1004-1, 1004-2, 1004-3, 1004-4, designated generally as 1004, are depicted in FIG. 5A). In one or more embodiments, an exemplary solution can be deployed remotely or locally on the device; that is, the tester 1099 can be on the device 1004 under test (i.e., on the tester's laptop, desktop, workstation, tablet, etc.) or can interact remotely with the device 1004 to issue commands and collect data. Note the L7 commands flowing to the devices 1004 and the L2 and L3 network metrics returning from the devices 1004. In the case of remote interaction with the device, the solution is deployed remotely on the devices 1004 and the user 1099 sends a command from his or her machine (e.g., laptop 1097) to initiate the test and send the metrics back. Heretofore, human interaction with a human tester standing by locally on the device 1004 has been employed to initiate Layer 7 command testing. In one or more embodiments, any normal operation a user may perform can be automated, to permit cross-layer correlation.

Still referring to FIG. 5A, the exemplary devices 1004-1, 1004-2, 1004-3, 1004-4 can be, for example, different devices on which certain apps are tested, to ensure correct functionality. An operator of a cellular telephony network, such as a cable MSO, would typically purchase a testing platform, such as an Accuver XCAL testing platform or the like. Such testing platforms typically function with all major brands of smartphones and operating systems. For example, to connect to a device and collect data with a platform such as XCAL or the like, iOS allows setting GO TO TASK, OPEN TASK, etc. as one of its hidden settings so that the automated program (script) can be executed. In one or more embodiments, the apps are simply normal apps that a user would typically use, such as the aforementioned social media, web browsers, and other pertinent applications. The devices 1004-1, 1004-2, 1004-3, 1004-4 can be, for example, normal cellular phones with extra permissions (in the case of the ANDROID operating system, "rooting" is a process that allows attaining root access to the ANDROID operating system code) to permit the inventive software instructions (e.g., scripts) to function (root permissions are not necessarily needed in all cases, but if necessary, root permissions can be granted to permit the scripts to execute—the skilled artisan will be familiar with various operating systems such as iOS and Android and what permissions/commands will be needed to allow scripts to execute). In a non-limiting example, test the performance of one or more conventional consumer-facing apps using the inventive scripts running on test phones of the cellular network operator, used for test purposes, not actual consumer-owned phones. Of course, with appropriate consents/permissions from the users, testing could be carried out on consumer phones. This may not be ideal, however, as automation is generally "tuned" to the device model it will be run on.

One or more embodiments can be employed on any suitable device operating system (e.g., Android, iOS) and on any type of cellular network 1008 (not limited to U.S. cellular networks). FIG. 5A shows a standard configuration with four devices but any desired number of test devices can be employed, depending on the testing platform capabilities. For example, the Accuver XCAL testing platform can handle sixty-four devices, and other platforms can handle different numbers of devices, and some may be essentially unlimited in terms of scaling capability. Another exemplary test platform that can be used in connection with one or more embodiments is the Ookla Wind® testing and monitoring solution (registered mark of OOKLA, LLC, Seattle, WA USA). The devices 1004 connect to the network 1008 via one or more wireless base stations 1095, and can be connected to the same or different base stations 1095 during the test.

FIG. 5A thus illustrates a four (4) test device setup without external device verification, using the proposed automated application evaluation system. The system is scalable and has no theoretical limit for deployment, unless limited by metric logging software.

Figure 5B:
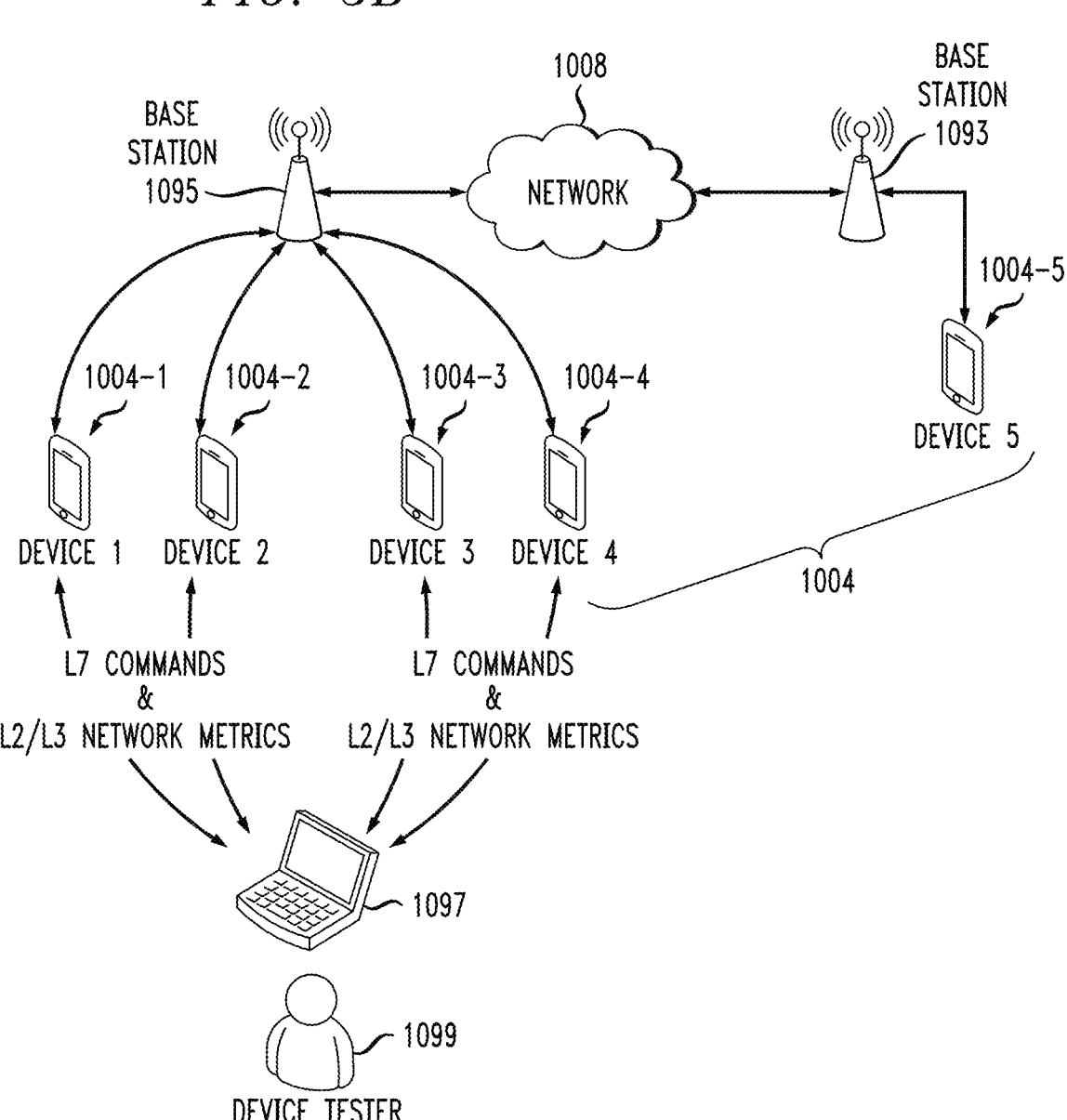
FIG. 5B is an alternative system diagram, in accordance with an aspect of the invention.

In an alternative approach depicted in FIG. 5B, another device 1004-5 checks devices 1004-1, 1004-2, 1004-3, 1004-4 after they have initiated and performed their checks (i.e., executed the scripts), as a "sanity check" to make sure the test script is running properly (referred to herein as a "checkpoint aspect"). For example, suppose there is a script that instructs the device to access a popular video sharing web site and watch three videos. After each video, a text, code, or signal may be sent to another phone 1004-5 to indicate "Video 1 completed watching" or "Video 1 started watching." In the latter case, the length of Video 1 will typically be known; if the remote phone does not receive the "Video 1 completed watching" message within the length of Video 1 plus a margin from the time the "Video 1 started watching" message is received, the remote phone can follow up by sending a command to re-initiate the test. Elements in FIG. 5B similar to those in FIG. 5A have received the same reference number and are not described again. Device 1004-5 is depicted as connected to network 1008 and devices 1004-1 through 1004-4 via another base station

1093, as a non-limiting example. FIG. 5B thus illustrates a four (4) test device setup with external device verification using the proposed automated application evaluation system. The system is scalable and has no theoretical limit for deployment, unless limited by existing metric logging software.

Figure 9:
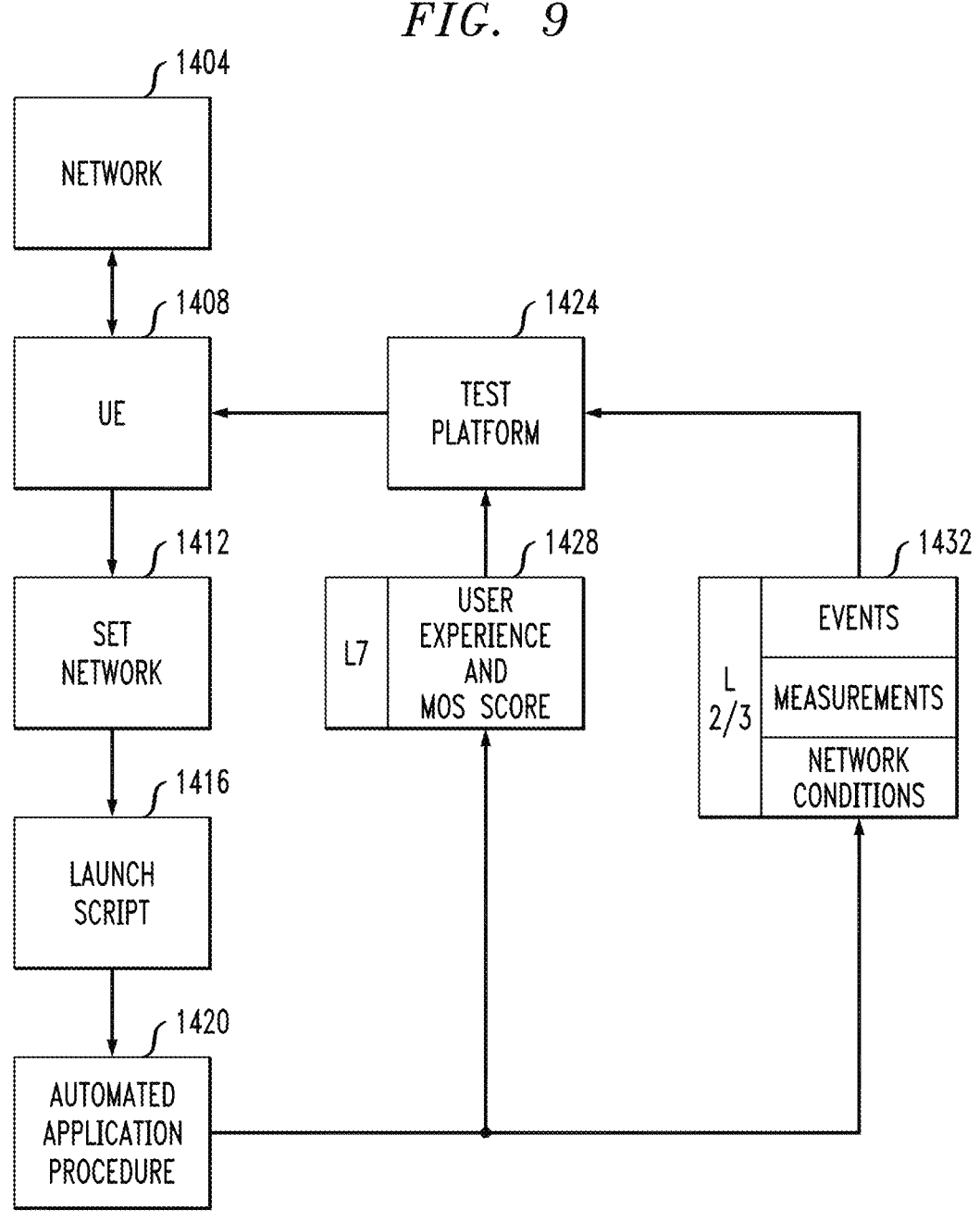
FIG. 9 is combined block diagram/flow chart/data flow diagram, in accordance with an aspect of the invention.

The particular steps of the automation can vary from application to application; however, an exemplary general process will now be described. Refer now to FIG. 9. Specialized software (scripts), which mimics user input, is loaded either directly onto the test devices (user equipment (UE) 1408) or onto a device (e.g., laptop 1097) which is tethered physically or wirelessly to the test devices. Such physical tethering is shown, for example, in FIG. 5B. Note the four phones/devices 1004-1 through 1004-4 connected to the laptop 1097. Appropriate configurations can be employed when running with the test platform 1424 or as a stand-alone terminal. That is to say, for example, it is possible to run as a stand-alone terminal without platform 1424, or optionally, couple to platform 1424 and run through the platform. Test devices (UE 1408) connect to the cellular network 1404 that is to be analyzed. Network conditions and network technology type (2G/3G/4G/LTE/5G/etc.) are set on the test devices, as depicted at 1412. The loaded specialized software (e.g., scripts) is launched either from test devices 1408 or tethered device, as the case may be, as depicted at 1416. Device events, network conditions, and measurements are logged using automated application procedure 1420 and sent to the tethered device or stored locally on the test devices. In some instances, the human device tester 1099 records the user experience/MOS (mean opinion score), but this can be automated as desired. Some embodiments use a paid MOS model, or a custom MOS model can be developed. Given the teachings herein, the skilled artisan can adapt known MOS models to implement one or more embodiments. The logged device events, network conditions, and measurements (L2/L3) are depicted at 1432. The recorded user experience and MOS are depicted at 1428.

FIG. 9 thus shows exemplary steps of how an automation method in accordance with one or more embodiments of the invention can function. To reiterate, in one or more embodiments, the user equipment/device 1408 is connected to the network 1404. At 1412, set the network conditions. At 1416, launch a script to initiate the automated application procedure 1420. The output data includes level 7 data 1428 and Layer 2 and 3 data 1432. Heretofore, Layers 2 and 3 could only be seen if they were manually correlated to Layer 7. In one or more embodiments, all of the data flows through a testing platform such as test platform 1424 (XCAL is a non-limiting example; any suitable test platform can be used).

FIG. 9 accordingly shows a high-level workflow for a testing platform, in accordance with an example embodiment. In one example embodiment, the configuration of the network is set (operation 1412) and a test script is launched (operation 1416). Again, conventionally, only the Layer 2 and Layer 3 data 1432 would be easily accessible. In one or more embodiments, the Layer 7 data 1428 and the Layer 2 and Layer 3 data 1432 flows through the testing platform 1424.

With continued reference to FIG. 9, and referring again to FIGS. 5A and 5B, in an exemplary workflow, determine which app to test, such as a social network app. Consider the development of the aforementioned script(s) per se. One or more users interact with the app in a normal manner and monitor how the user uses the app. Translate the monitored usage action to code and link the code with the data collection platform 1424. A user uses the device application normally (such as scrolling through a social media app and posting comments/pictures) and makes notes on what actions were done (step 1: login, step 2: post comment, etc.). From those notes, automation is created to mimic those user inputs. In one or more embodiments, as at 1412, set specific network KPIs that it is desired to capture for Layer 2 and Layer 3, along with the technology (such as LT or 5G) and other basic metrics, on the data collection platform 1424.

Start the test from, for example, the console side of the data collection platform 1424 (e.g., in a browser of machine 1097). KPIs can be captured and analyzed to see network performance and help explain why some applications may not function as expected on the network. It is also possible to set the test for automatic initiation (for example, if certain KPIs are met or not met). For example, a setting is possible such that if a Reference Signal Received Power (RSRP) of, say, −80 or −100 is observed, the cell phone or the test platform will pick up on the observation and trigger the scripts to run. One could also, for example, trigger the scripts to run if the devices leaves a first cell tower 131 and attaches to a second cell tower 132, especially if the two towers were operated by different providers (say, home network to roaming network). A test can be is initiated when a certain KPI is failed, to see how the app works in bad conditions, or when a certain KPI is met (in the latter case, since some minimum signal might be needed to make the test meaningful). KPIs could relate, for example, to a certain threshold for RSRP or Signal-to-Interference-and-Noise-Ratio (SINR). In one or more embodiments, the automated test is run on as many devices 1004 as are desired (subject to any limitations of platform 1424) and the testing will log Layer 2 and Layer 3 data (the terms "data" and "events" are used interchangeably herein) with timestamps as well as the Layer 7 events with timestamps.

As noted, given the teachings herein, the skilled artisan will be able to adapt conventional test platforms to implement one or more embodiments. For example, employ a test platform that has an Android Debug Bridge (ADB) shell that accepts ADB commands. ADB commands are direct input commands into the device. The commands are executed line-by-line. In an alternative aspect, the commands can be packaged as an Android Package Kit (APK) application which can be sent to the device 1004 to simulate the user's interactions. In essence, one or more embodiments make novel use of existing software and hardware to provide the app on the device with instructions that simulate a user's interaction with the device. All commands (and automated scenarios) could be packaged into an APK, for example. Advantageously, this novel use leads to repeatability and correlation among the layers. In one or more embodiments, the code is executed line-by-line and each line has a specific time set to it, so it is possible to see where in the application use a particular event occurred. This aspect advantageously provides a deeper level of correlation than what would be seen on a conventional event logging page.

FIGS. 10A and 10B show exemplary correlation between commands at the different levels, in accordance with an aspect of the invention. The first column in each of FIGS. 10A and 10B shows the time stamp (it will be appreciated that the data in FIGS. 10A and 10B is broken into two tables for legibility; a single data file could be employed with a single column for time stamp, as desired). The second and third columns in FIG. 10A show the longitude and latitude determined by GPS (global positioning system), it being understood that longitude and latitude can be determined in various ways such as GPS, on-board the device, etc., and that values determined in different ways could be included if desired. The fourth column in FIG. 10A, Event Logging Status, indicates whether the test failed or succeeded. The fifth column in FIG. 10A indicates what technology was used for the given event; e.g., long-term evolution (LTE) or fifth generation (5G). Columns six and seven, respectively, in FIG. 10A list LTE and 5G events. Column eight in FIG. 10A provides a short name to call the desired test script; in this case, simulated social media usage. Column nine in FIG. 10A and column 2 in FIG. 10B show the event details. Columns 3-6 in FIG. 10B show various throughput measurements. The final column in FIG. 10B shows the QoS Class Identifier (QCI); in the example, QCI 9, Video (Buffered Streaming) TCP-Based (for example, www, email, chat, ftp, p2p and the like), typically used as default carrier. As will be appreciated by the skilled artisan, depending on what data collection platform is employed, potentially hundreds of different KPIs could be displayed; FIGS. 10A and 10B are non-limiting examples.

It will be appreciated that conventional systems, even when partially automated, provide access to the data of Layers 1-3, with particular attention typically paid to Layers 2 and 3; date from higher layers (Layer 4 and up) is not visible. Advantageously, in one or more embodiments, because of the automation having a set time, and because the automation is run through the device as a command, higher-layer data can be seen on event logging. Because it is known how much time each step is in the automation, and precisely when each step happens, higher level (level 7 data) can be seen on event logs. Stated differently, because one or more embodiments employ a simulated interaction via coded commands, the results can be logged, and this advantageously allows correlating between the different layers (e.g., Layers 2, 3, and 7) across time. In the prior art, a human user must watch the device and assign a user experience score. While some embodiments can employ a human user to develop an MOS score, a paid MOS platform or an in-house developed one could eliminate the human user in one or more embodiments. In another aspect of one or more embodiments, the device screen can be recorded, so that the user need not be present at the device—the screen recording can be uploaded for human or automated/programmatic viewing.

In one or more embodiments, simulating the human interactions (in a repeatable fashion), by issuing automated commands, enables the logging of the results of the interaction and the correlation in time between the data of the various layers. Conventionally, a user would simply watch random human-machine interactions.

One or more embodiments automatically execute interaction-emulating code under a variety of different network conditions. Observations are made regarding how the device 1004 is behaving/performing, and review of the logs 1432 can be carried to check, for example, the RF KPIs and other KPIs. As the device under test moves closer to the edge of the cell, it will be seen that the signal strength degrades, and the quality of the user experience degrades. Numerical values of various parameters that result in application failure can be determined, and those values can be set as operational thresholds as part of, for example, automated deployments (remotely or locally). For example, it can be determined that it is desired to execute after a certain RSRP value is met (or is not met), or when the RSRP is between a first pair of values, or a second pair of values. It is also possible to make settings so that the app will only execute between two KPI values. One or more embodiments advantageously permit determining the minimum KPI value needed to execute the app, which could not be achieved by the prior art. For example, suppose the connection is very unstable because the RSRP is too low; say, the throughput is so low that the app cannot be used. There may be severe lag in a video, for example, or it will not even load. In one or more embodiments, automation and varying time for each step allows determining KPIs in the form of the minimum KPI to run each app. For example, depending on network conditions for the device, the test may not even be attempted; or the test may only be initiated with a KPI in a certain range of values, or the like.

In one or more embodiments, based on the test results, the test script can be reconfigured and remotely re-transferred to the devices 1004 (for example, if the test process itself, as opposed to the results thereof, was unsatisfactory in some manner, correct). In a non-limiting example, as part of the technological process of running a wireless network, testing of consumer-facing apps is carried out by the network operator (for example, on the network operator's devices but not on the consumer's devices). In another aspect, in one or more embodiments, once results are obtained, the cellular network can be reconfigured (e.g., modified, repaired and/or upgraded) to improve service. For example, the radio access network (RAN) sites (cell towers) can be adjusted accordingly. The antenna or antenna array can be mechanically and/or electrically adjusted to change the signal strength, signal pattern, etc. after the test results are evaluated, or the antenna or antenna array can be changed to a new antenna or antenna array. This is one exemplary practical application of aspects of the invention. One or more embodiments involve testing of known commercial apps; the test results are not used to change the apps but rather to fix the wireless network when the app(s) do/does not perform. Of course, one could instead, or in addition, modify the app to perform better under marginal network conditions. For example, take logs and if it is noted that even with a relatively robust throughput such as 15 Mbps, lag is noted for a certain action or a certain part of an app, fix the app. Furthermore in this regard, in one or more embodiments, if the test is satisfactory, nothing needs to be changed. However, if the test is unsatisfactory, changes can be made to the network in response to the app not performing well on the test. Changes can be made in the base station, such as to the antenna(s)/ antenna arrays. For example, the beam steering parameters of the base station antenna array can be changed in some cases. One non-limiting example is adjusting parameters (e.g., correlation, embedded radiation efficiency, diversity gain, and MIMO capacity) of a multiple input multiple output (MIMO) antenna array.

Inter-layer correlation according to one or more embodiments advantageously helps in identifying and correcting network problems. The quality impairment of the application could be, for example, a delay loading videos or transitioning between videos in a social media app (or generally, latency/poor quality, delays in bandwidth-intensive operations, or the like). Looking for correlation between the time of impairment (say, when the "loading" icon is on the screen) and a corresponding change in the Layer 2 and/or Layer 3 data (say, when SINR is below a value of 15), it is observed that data throughput in the network is lower as compared to when there is a higher SINR value, in which case the app runs better and provides a better user experience. It is worth noting that data collection programs may capture, for example, hundreds or thousands of different metrics; capturing a few hundred is typical. Consider, for example, a specific issue with an app ("troublesome app") on the network. In one or more embodiments, tests could be immediately deployed on that application (for example, in lieu of field technicians running tests). The troublesome app could also be run in different markets or different areas, with different cellular network conditions, to determine under what network conditions performance of the troublesome app begins to suffer/degrade, or whether the troublesome app is in fact having performance difficulties under all, or almost all, the test conditions. In another aspect, in some cases, when an update to an app is released, the app may send and/or receive an atypically large volume of data. For example, suppose a video sharing app releases a "bad" update in that the previous release ran fine at 10 Mbps and the "bad" update now requires 15-20 Mbps to run properly. In this latter case, there may not be any network issues, but rather an issue with the app itself.

As noted, in one or more embodiments, once results are obtained, the cellular network can be reconfigured to improve service, such as, for example, making changes to the radio access network (RAN) sites (cell towers). Many other different types of remedial actions can be taken. For example, based on the measured performance at the app layer, the settings on the network can be adjusted to, for example, (1) modify when a handover happens, (2) identify where a new site or sector needs to be deployed, (3) identify a threshold at which roaming to a partner network should be triggered, and/or (4) to change the Dual SIM Dual Standby (DSDS) settings (in the device 140) to trigger a more efficient and/or seamless network transition.

In general, mobile networks are constantly engineered to improve seamless mobility and provide additional capacity. One or more embodiments can also include tests which identify where additional capacity is needed in the network, such that the app level experience is unaffected by increasing network demand and user contention.

It will be appreciated that, currently, there is no mechanism for synchronization and correlation of Layer 2/Layer 3 information and user experience. In addition, tests are limited by manual synchronization of Layer 7 operations and the number of test users required to manually operate the devices. One or more embodiments overcome these problems with the prior art via specialized software (currently through ADB) that synchronizes and correlates measurements and events from the network Layer (L3)/data link Layer (L2) with application Layer events (L7) and user experience.

In one or more embodiments, implementation of the specialized software automates all L7 commands, effectively removing the requirement for direct human interaction. In addition, the software synchronizes L7/L3/L2 data, which allows for direct correlation analysis. In one or more embodiments, the software is directly scalable, allowing for simultaneous concurrent test cases to be executed in an automated fashion on any number of devices.

The steps of the automation process can vary, as appropriate, from application to application; however, by way of review, referring again to FIG. 9, in one or more embodiments, specialized software (e.g., scripts) which mimics user input is loaded either directly onto the test devices 1408 or onto a device which is tethered physically or wirelessly to the test devices. The test devices connect to the cellular network 1404 that will be analyzed. Network conditions and network technology type (2G/3G/4G/LTE/5G/etc.) are set on test devices as indicated at 1412. In step 1416, the specialized software (e.g., script) is launched either from the test devices or tethered device(s). During the automated application procedure 1420, device events, network conditions, and measurements are logged and sent to the tethered device or stored locally on test devices. The device tester records user experience/MOS score. The stored Layer 2/Layer 3 data is shown at 1432 and the stored Layer 7 data is shown at 1428.

One or more embodiments provide a process of running multiple device tests using applications which is not currently possible through single user testing. The current process of manually executing applications and simulating normal use cannot produce repeatable, identical application layer test procedures and results. Furthermore, the current process of manually executing applications does not allow for remote testing of devices, and currently, there is no universal automation method for application usage. In one or more embodiments, an automated test (e.g., testing user experience on a mobile device such as a cellular telephone) and remediation method includes using ADB command inputs to execute functions on the device 1408 without physically interacting with the device's peripherals; the ADB command inputs can be configured, for example, to execute step-by-step.

The automation can optionally trigger other non-test devices to interact with the devices (i.e., call/message/send & receive packets) to enable more complex automation and confirm checkpoints (as discussed above with regard to the checkpoint aspect) in the code sequence. FIG. 5A illustrates a four test device setup without external device verification using an exemplary automated application evaluation system. The system is scalable and has no theoretical limit for deployment, unless limited by existing metric logging software (such as an existing test platform 1424).

The code (e.g., scripts) may be loaded directly onto the test devices or the code's commands may be sent through a wired or wireless tether from a terminal to the test devices. For example, consider a phone call—it is desired to call device 1004-5. The device may have code to, for example, pick up (the call) for 30 seconds or a minute and then hang up and possibly call back. In the case of an app, the test device (e.g., one of 1004-1 through 1004-4) can send a text or social media message to device 1004-5 and device 1004-5 sends a confirmation message back. FIG. 5B illustrates a four test device setup with external device verification using an exemplary automated application evaluation system. The system is also scalable and has no theoretical limit for deployment, unless limited by existing metric logging software (such as an existing test platform 1424).

In addition to ADB, embodiments can be performed using other coding languages, such as, but not limited to: JavaScript, Python, C, C++, Objective-C, Swift, and the like. Recapitulation Given the discussion thus far, it will be appreciated that, in general terms, an exemplary method, according to an aspect of the invention, includes facilitating execution of at least one script and at least one application on at least one wireless test device (e.g., 1004-1 through 1004-4). The at least one script includes device-executable code configured to simulate user interaction with the at least one application on the at least one wireless test device. The at least one script is executed to simulate the user interaction, while the at least one wireless test device is connected to a wireless network (e.g., 130). In one or more embodiments, the wireless network is a cellular network (e.g., 3G, 4G, 5G, 6G) or mobile network distributed over land areas called "cells," each served by at least one fixed-location transceiver (typically three cell sites or base transceiver stations). These base stations provide the cell with the network coverage which can be used for transmission of voice, data, and other types of content. A cell typically uses a different set of frequencies from neighboring cells, to avoid interference and provide guaranteed service quality within each cell. Such a cellular network is distinguished from relatively short range networks such as "Wi-Fi" and Bluetooth (short-range wireless technology standard that is used for exchanging data between fixed and mobile devices over short distances and building personal area networks (PANs), employing UHF radio waves in the ISM bands, from 2.402 GHz to 2.48 GHz, mainly used as an alternative to wire connections, to exchange files between nearby portable devices and connect cell phones and music players with wireless headphones, transmission power typically limited to 2.5 milliwatts, giving it a very short range of up to 10 meters (33 ft)). Regarding the scripts, see above discussion of ADB and APK, or any other suitable language such as Python.

The method further includes logging results of the execution of the at least one script and the at least one application using a test platform such as 1424. The results include application layer metrics (e.g., OSI Layer 7) and at least one of data link layer metrics (e.g., OSI Layer 2) and network layer metrics (e.g., OSI Layer 3). The application layer metrics and the at least one of data link layer metrics and network layer metrics are correlated by timestamp, for example, as seen in FIG. 10. It will be appreciated that this automated testing and correlation by timestamp inherently enhances repeatability as compared to current manual techniques that have variations.

One or more embodiments further include setting network conditions of the wireless network on the at least one wireless test device prior to executing the at least one script and the at least one application; in such cases, in the logging of the results, the results can further include the network conditions. See, for example, FIG. 10.

The aforementioned repeatability is even more advantageous when testing multiple devices. Because one or more embodiments can be remotely deployed, a human tester standing next to the device is not needed in one or more instances.

In one or more embodiments, the executing step includes executing the at least one script and the at least one application on a plurality of wireless test devices 1004-1 through 1004-4 (i.e., the at least one device includes a plurality of devices), for example; and the logging step includes logging the results of the execution of the at least one script and the at least one application on the plurality of wireless test devices. In at least some such embodiments, the executing step includes simultaneously executing the at least one script and the at least one application on the plurality of wireless test devices.

One or more instances further include, responsive to the results of the execution, remediating at least one issue with the wireless network. Non-limiting examples of such remediation include increasing capacity of the wireless network (responsive, for example, to identifying where a new site or sector needs to be deployed); adjusting at least one radio access network (RAN) site of the wireless network (for example, changing antenna array parameters on one or more of the towers 131, 132); modifying parameters of the wireless network to change when a cell-to-cell handover occurs; modifying parameters of the wireless network to change when roaming to a partner network should be triggered (for example, identifying a signal to noise threshold at which roaming to a partner network should be triggered); and/or changing Dual SIM Dual Standby (DSDS) settings in at least one of the devices (such as a dual-SIM device 140) to trigger a more efficient and/or seamless network transition.

One or more instances even further include operating the wireless network with the at least one issue remediated, thereby improving the performance of the at least one application.

As noted, the application itself can be remediated to improve its performance, instead of or in addition to remediating the network. Thus, one or more embodiments further include, responsive to the results of the execution, facilitating remediation of at least one issue with the at least one application. For example, the network operator can make the app developer aware of the problem so that the app developer can fix the problem.

One or more such embodiments further include operating the wireless network and executing the (remediated) application on at least one wireless execution device (can be same or different than test device) with the at least one issue remediated, thereby improving the performance of the at least one application.

In one or more embodiments, the loading, executing, and logging steps are carried out without human input to the plurality of wireless test devices. As discussed, in at least some instances, no user input or physical access is needed to test the devices. As noted, the user experience evaluation can be done by a person 1099 on the device, by a person 1099 remotely looking at a replay, or automatically.

In one or more embodiments, in the logging step, the results include the application layer metrics (e.g., OSI Layer 7), the data link layer metrics (e.g., OSI Layer 2), and the network layer metrics (e.g., OSI Layer 3).

One or more embodiments further include injecting commands of the at least one script from a remote device (e.g., 1097) to the at least one wireless test device 1004-1, 1004-2, 1004-3, and/or 1004-4, to facilitate the execution of the at least one script and the at least one application. Optionally, the scripts loaded from the test platform 1424.

In some instances, the executing and logging steps are initiated in response to a comparison of at least one key performance indicator to at least one predetermined value. For example, in one or more embodiments, the comparison can be carried out by logic within the script, while the test platform 1424 collects the data (e.g., MOS, user experience, as seen at 1428) when the script executes. The script can detect the cellular network conditions (measures of signal-to-noise ratio, signal strength, etc.) on the device on which it is executing. For example, the script will launch (or not launch) depending on the detected network conditions. In some instances, the script can also output its own miniature log, including how long the app took to perform a certain task, such as loading a page. This time can be compared to an acceptable time limit for performing the given action, and this aspect can be used in connection with the corresponding data KPIs from the test platform 1424 to determine optimal network conditions. As an example, suppose the script determines and logs the fact that a popular mobile web browser loaded a web page in 10 seconds, while it is desired that this action take place in no more than 5 seconds. Additional tests can then be conducted under different network conditions and the corresponding KPIs from the test platform 1424 can be used to determine appropriate values for RSRP, SINR, or the like that are required to meet the threshold for acceptable loading time. In essence, the script may initiate a test based on a certain range of RSRP (or other important parameter) and may log the time to carry out each action. This logged time can then be used together with the data from test platform 1424 to determine appropriate values of network parameters to achieve the desired app performance. At least some test platforms 1424 may be unable to log the elapsed time to complete each action; thus, the script-based elapsed time logging is appropriate in such instances.

One or more embodiments further include monitoring, with at least one remote device 1004-5, the execution of the at least one script and the at least one application on the at least one wireless test device 1004-1, 1004-2, 1004-3, and/or 1004-4; and, responsive to the monitoring indicating an issue, the at least one remote device 1004-5 instructing the at least one wireless test device to re-initiate the execution of the at least one script and the at least one application on the at least one wireless test device. Refer, for example, to the discussion of the "sanity check" with regard to FIG. 5B.

In another aspect, an exemplary system (e.g., one or more of platform 1424, devices 1004, 1097) includes a memory 730; and at least one processor 720, coupled to the memory, and operative to carry out or otherwise facilitate any one, some, or all of the method steps described herein.

In another aspect, an exemplary system for testing application performance in wireless networks includes at least one wireless test device (1004-1, 1004-2, 1004-3, and/or 1004-4) configured to execute at least one script and at least one application while the at least one wireless test device is connected to the wireless network 130. The at least one script includes device-executable code configured to simulate user interaction with the at least one application on the at least one wireless test device. The at least one script is executed to simulate the user interaction. The system also includes a test platform 1424 configured to log results of the execution of the at least one script and the at least one application. The results include application layer metrics and at least one of data link layer metrics and network layer metrics. The application layer metrics and the at least one of data link layer metrics and network layer metrics are correlated by timestamp (see FIG. 10).

In one or more embodiments, the at least one wireless test device is further configured to set network conditions of the wireless network prior to executing the at least one script and the at least one application, and the results further include the network conditions. Thus, in one or more embodiments, the wireless test device sets the network conditions at 1412; the device's SIM will latch onto the network. In some instances, the test platform 1424 can send the test device a "lock" command to use certain RF bands, or to only connect to one of several available mobile network providers.

As noted, the at least one wireless test device can include a plurality of wireless test devices, and the test platform can accordingly be configured to log the results of the execution of the at least one script and the at least one application on the plurality of wireless test devices.

In at least some cases, the plurality of wireless test devices are configured to simultaneously execute the at least one script and the at least one application.

In some instances, the results include the application layer metrics, the data link layer metrics, and the network layer metrics.

One or more embodiments further include a remote device such as 1097 coupled to the at least one wireless test device and configured to inject commands of the at least one script to the at least one wireless test device to facilitate the execution of the at least one script and the at least one application.

As discussed above, in one or more embodiments, the executing and logging are initiated in response to comparison of at least one key performance indicator to at least one predetermined value, by logic within the script. Thus, in one or more embodiments, in the system, the at least one script includes logic configured to compare at least one key performance indicator to at least one predetermined value and to cause execution of the at least one script in response to the comparison. For example, the portion of the script that checks the performance indicator could run continuously and the actual "test portion" of the script that simulates the user action could execute in response to the comparison. The logging of the results would then be initiated in response to comparison of at least one key performance indicator to at least one predetermined value in consequence of the test portions of the script running in response to the comparison.

One or more embodiments further include at least one remote device 1004-5 configured to monitor the execution of the at least one script and the at least one application on the at least one wireless test device, and, responsive to the monitoring indicating an issue, instruct the at least one wireless test device to re-initiate the execution of the at least one script and the at least one application on the at least one wireless test device.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine-readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

FIG. 3 is a block diagram of at least a portion of an exemplary system 700 that can be configured to implement at least some aspects of the invention, and is representative, for example, of one or more of the apparatus or modules shown in the figures (e.g., test platform, laptop 1097). As shown in FIG. 3, memory 730 configures the processor 720 to implement one or more methods, steps, and functions (collectively, shown as process 780 in FIG. 3). The memory 730 could be distributed or local and the processor 720 could be distributed or singular. Different steps could be carried out by different processors, either concurrently (i.e., in parallel) or sequentially (i.e., in series).

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:

facilitating execution of at least one script and at least one application on at least one wireless test device, the at least one script including device-executable code configured to simulate user interaction with the at least one application on the at least one wireless test device, the at least one script being executed to simulate the user interaction, while the at least one wireless test device is connected to a wireless network;

logging results of the execution of the at least one script and the at least one application using a test platform, the results including application layer metrics and at least one of data link layer metrics and network layer metrics, wherein the application layer metrics and the at least one of data link layer metrics and network layer metrics are correlated by timestamp; and identifying a system condition to be remediated, the identifying comprising correlating an application layer activity defined by the application layer metrics with a network activity defined by the at least one of the data link layer metrics and the network layer metrics.

2. The method of claim 1, further comprising setting network conditions of the wireless network on the at least one wireless test device prior to executing the at least one script and the at least one application, wherein, in the logging of the results, the results further include the network conditions.

3. The method of claim 2, wherein:

the execution includes executing the at least one script and the at least one application on a plurality of wireless test devices; and the logging step includes logging the results of the execution of the at least one script and the at least one application on the plurality of wireless test devices.

4. The method of claim 3, wherein the execution includes simultaneously executing the at least one script and the at least one application on the plurality of wireless test devices.

5. The method of claim 4, further comprising, responsive to the results of the execution, remediating at least one issue with the wireless network.

6. A method comprising:

facilitating execution of at least one script and at least one application on at least one wireless test device, the at least one script including device-executable code configured to simulate user interaction with the at least one application on the at least one wireless test device, the at least one script being executed to simulate the user interaction, while the at least one wireless test device is connected to a wireless network; and logging results of the execution of the at least one script and the at least one application using a test platform, the results including application layer metrics and at least one of data link layer metrics and network layer metrics, wherein the application layer metrics and the at least one of data link layer metrics and network layer metrics are correlated by timestamp, wherein the remediating comprises at least one of: increasing capacity of the wireless network, adjusting at least one radio access network (RAN) site of the wireless network, modifying parameters of the wireless network to change when a cell-to-cell handover occurs, modifying parameters of the wireless network to change when roaming to a partner network should be triggered, and/or changing Dual SIM Dual Standby (DSDS) settings in at least one of the devices to trigger a more efficient and/or seamless network transition.

7. The method of claim 5, further comprising operating the wireless network with the at least one issue remediated, thereby improving the performance of the at least one application.

8. The method of claim 4, further comprising, responsive to the results of the execution, facilitating remediation of at least one issue with the at least one application.

9. The method of claim 8, further comprising operating the wireless network and causing execution of the application on at least one wireless execution device with the at least one issue remediated, thereby improving the performance of the at least one application.

10. The method of claim 4, wherein the loading, executing, and logging steps are carried out without human input to the plurality of wireless test devices.

11. The method of claim 1, wherein, in the logging step, the results include the application layer metrics, the data link layer metrics, and the network layer metrics.

12. The method of claim 1, further comprising injecting commands of the at least one script from a remote device to the at least one wireless test device to facilitate the executing of the at least one script and the at least one application.

13. The method of claim 1, wherein the executing and logging steps are initiated in response to comparison of at least one key performance indicator to at least one predetermined value.

14. The method of claim 1, further comprising:

monitoring, with at least one remote device, the execution of the at least one script and the at least one application on the at least one wireless test device; and responsive to the monitoring indicating an issue, the at least one remote device instructing the at least one wireless test device to re-initiate the execution of the at least one script and the at least one application on the at least one wireless test device.

15. A non-transitory computer readable medium comprising computer executable instructions which when executed by a computer cause the computer to perform a method comprising:

facilitating execution of at least one script and at least one application on at least one wireless test device, the at least one script including device-executable code configured to simulate user interaction with the at least one application on the at least one wireless test device, the at least one script being executed to simulate the user interaction, while the at least one wireless test device is connected to a wireless network;

logging results of the execution of the at least one script and the at least one application using a test platform, the results including application layer metrics and at least one of data link layer metrics and network layer metrics, wherein the application layer metrics and the at least one of data link layer metrics and network layer metrics are correlated by timestamp; and identifying a system condition to be remediated, the identifying comprising correlating an application layer activity defined by the application layer metrics with a network activity defined by the at least one of the data link layer metrics and the network layer metrics.

16. A system comprising:

a memory; and at least one processor, coupled to the memory, and operative to:

facilitate execution of at least one script and at least one application on at least one wireless test device, the at least one script including device-executable code configured to simulate user interaction with the at least one application on the at least one wireless test device, the at least one script being executed to simulate the user interaction, while the at least one wireless test device is connected to a wireless network;

log results of the execution of the at least one script and the at least one application using a test platform, the results including application layer metrics and at least one of data link layer metrics and network layer metrics, wherein the application layer metrics and the at least one of data link layer metrics and network layer metrics are correlated by timestamp; and identify a system condition to be remediated, the identifying comprising correlating an application layer activity defined by the application layer metrics with a network activity defined by the at least one of the data link layer metrics and the network layer metrics.

17. A system for testing application performance in wireless networks, comprising:

at least one wireless test device configured to execute at least one script and at least one application while the at least one wireless test device is connected to the wireless network, the at least one script including device-executable code configured to simulate user interaction with the at least one application on the at least one wireless test device, the at least one script being executed to simulate the user interaction; and a test platform configured to log results of the execution of the at least one script and the at least one application, the results including application layer metrics and at least one of data link layer metrics and network layer metrics, and configured to identify a system condition to be remediated, the identifying comprising correlating an application layer activity defined by the application layer metrics with a network activity defined by the at least one of the data link layer metrics and the network layer metrics, wherein the application layer metrics and the at least one of data link layer metrics and network layer metrics are correlated by timestamp.

18. The system of claim 17, wherein the at least one wireless test device is further configured to set network conditions of the wireless network prior to executing the at least one script and the at least one application, and wherein the results further include the network conditions.

19. The system of claim 18, wherein the at least one wireless test device comprises a plurality of wireless test devices, and the test platform is configured to log the results of the execution of the at least one script and the at least one application on the plurality of wireless test devices.

20. The system of claim 19, wherein the plurality of wireless test devices are configured to simultaneously execute the at least one script and the at least one application.

21. The system of claim 17, wherein the results include the application layer metrics, the data link layer metrics, and the network layer metrics.

22. The system of claim 17, further comprising a remote device coupled to the at least one wireless test device and configured to inject commands of the at least one script to the at least one wireless test device to facilitate the execution of the at least one script and the at least one application.

23. The system of claim 17, wherein the at least one script includes logic configured to compare at least one key performance indicator to at least one predetermined value and to cause execution of the at least one script in response to the comparison and logging are initiated in response to comparison of at least one key performance indicator to at least one predetermined value.

24. The system of claim 17, further comprising at least one remote device configured to:

monitor the execution of the at least one script and the at least one application on the at least one wireless test device; and responsive to the monitoring indicating an issue, instruct the at least one wireless test device to re-initiate the execution of the at least one script and the at least one application on the at least one wireless test device.

* * * * *